Oct. 7, 1952     A. G. TOMOLA     2,612,921
EGG OPENER
Filed Dec. 19, 1949
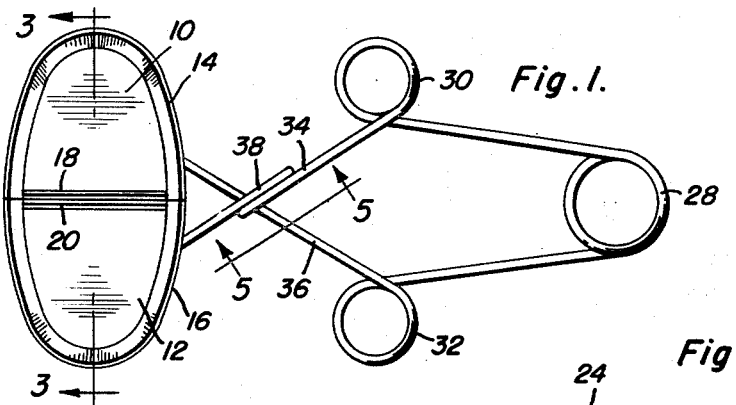
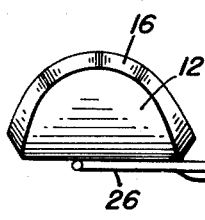
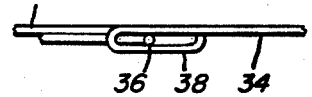
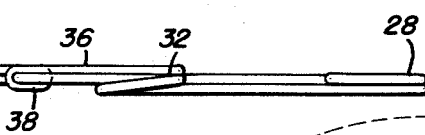
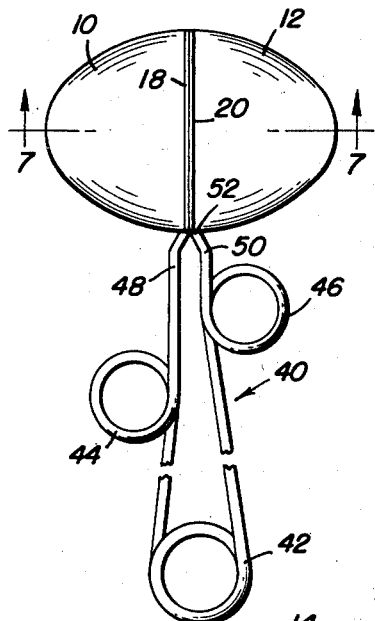
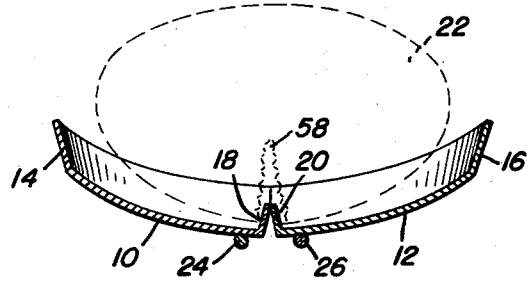
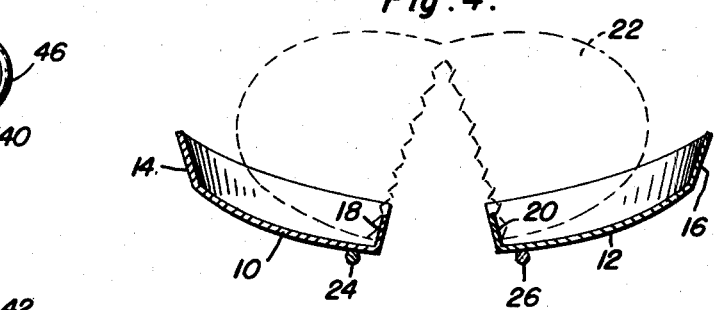
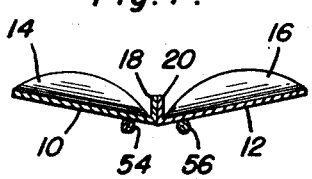
Anthony G. Tomola
INVENTOR.

Patented Oct. 7, 1952

2,612,921

UNITED STATES PATENT OFFICE 2,612,921

EGG OPENER

Anthony G. Tomola, Fairport Harbor, Ohio

Application December 19, 1949, Serial No. 133,750

1 Claim. (Cl. 146—2)

This invention relates to a device for use in homes and in restaurants primarily designed to facilitate the opening of eggs in such a manner that the egg shell will be retained on the device and be prevented from falling into the container receiving the egg.

An important object of this invention is to provide a device for opening eggs which accomplishes the opening merely by the pressure of a hand on the handle of the device, the device being provided with actuated jaws and rims for retaining the egg shell after the egg has been opened.

Yet another important object of this invention is to provide a device which is relatively simple in design and construction, cheap to manufacture in large quantities, extremely easy to manipulate and very useful for its intended purpose.

A further object of this invention is to provide an egg opener comprising a pair of complementary arcuate plates contacting each other, resilient means for spreading said plates apart, and egg piercing means carried by said plates at the contact point.

These, together with various ancillary objects and features of the invention which will later become apparent as the following description proceeds, are attained by the device, a preferred embodiment of which has been illustrated by way of example only in the accompanying drawings, wherein:

Figure 1 is a top plan view of the device;

Figure 2 is a side elevational view of the device;

Figure 3 is a sectional view taken substantially on the plane of section line 3—3 of Figure 1;

Figure 4 is a view similar to Figure 3 showing a different position of the device;

Figure 5 is a sectional view taken substantially on the plane of section line 5—5 of Figure 1;

Figure 6 is a side elevational view of a modified form of the device; and

Figure 7 is a sectional view taken substantially on the plane of section line 7—7 of Figure 6.

Specific reference is now made to the drawings. In the several views in the accompanying drawings and in the following specification reference characters indicate corresponding elements throughout.

The present device comprises a pair of arcuated plates 10 and 12 which are provided with a peripheral rim 14 and 16 respectively. The inner edges of the plates are provided with piercing means in the form of vertical or upstanding flanges 18 and 20. The plates 10 and 12 are in effect complementary jaws which both receive an egg 22 when in a closed or contacting position.

Riveted or otherwise secured to the under surface of the plates are the free end portions 24 and 26 of a spring wire which is bent intermediate its ends to form a coil 28. The wire is further provided with laterally extending finger-engaging eyes 30 and 32, the wire being provided with portions 34 and 36 that are crossed and contiguous with the free end portions 24 and 26. Thus the bent wire is, in effect, a handle, which is so constructed as to normally urge the complementary plates 10 and 12 together so that the piercing flanges 18 and 20 contact each other. It will thus be understood that pressure on the handle by urging the finger engaging eyes 30 and 32 towards each other, will cause the jaws or complementary plates 10 and 12 to be spread apart. In order to prevent substantial vertical movement or slippage between the complementary plates 10 and 12, the portion 34 of the wire is bent to form a loop 38 which receives the other portion 36 and acts as a guide therefor, as will be readily understood.

The modification shown in Figures 6 and 7 is substantially the same in construction and design as the modification shown in Figures 1 to 5 with respect to the plates 10 and 12, the rims 14 and 16 and the piercing flanges 18 and 20, but differs from the first modification solely in the construction of the wire handle. As shown clearly in Figure 6, a wire handle 40 is provided which is bent intermediate its ends to form a spring coil 42 and a further bend intermediate its ends to form laterally extending finger-engaging eyes 44 and 46. The eyes 44 and 46 are contiguous with portions 48 and 50 respectively which are crossed as at 52 and secured at their free ends as at 54 and 56 to the under surface of the plates 10 and 12. Although the handle in the modification shown in Figures 6 and 7 functions substantially in the same way as the handle shown in the modification of Figures 1 to 5, no guide is provided and it is generally simpler in design.

In use, the device is held in the position shown in Figure 1, and the egg is tapped on the piercing flanges 18 and 20 to form a slight crack 58. Thereafter, the eyes 30 and 32 are urged towards each other to spread the plates 10 and 12 as shown in Figure 4, whereupon the crack 58 is widened and the liquid contents of the egg falls into a container between the plates. The shells remain on the plates.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

In an egg opener having a pair of identical elongated complementary arcuate plates each having a semioval shaped peripheral edge and a transverse edge, rims extending vertically and outwardly from said peripheral edges, vertical flanges having horizontal egg piercing edges carried by said transverse edges, and an operating handle carried by said plates; the improvement wherein said handle comprises a single piece of spring steel wire bent intermediate its ends to form a pair of integral legs resiliently interconnected by a coil, said legs being crossed and secured at their ends to said plates to urge said plates horizontally towards each other, said legs being bent intermediate their point of crossing and said coil to form finger receiving loops lying in a common plane with said coil, one of said legs being bent at the point of crossing to form a narrow elongated loop receiving and guiding the other of said legs to insure horizontal spreading only of said plates, said narrow elongated loop lying in a plane normal to said common plane.

ANTHONY G. TOMOLA.

REFERENCES CITED

The following references are of record in the file of this patent:

UNITED STATES PATENTS

| Number | Name | Date |
|---|---|---|
| 824,748 | Schneider | July 3, 1906 |
| 1,590,813 | Donovan | June 29, 1926 |
| 1,705,950 | Wright | Mar. 19, 1929 |

OTHER REFERENCES

Central Scientific Company, General Catalogue J-141, Copyright 1941, page 132, items 12150 and 12155.